US012257874B2

(12) United States Patent
Jeong et al.

(10) Patent No.: US 12,257,874 B2
(45) Date of Patent: Mar. 25, 2025

(54) BALL JOINT ASSEMBLY FOR VEHICLE, STABILIZER LINK INCLUDING SAME, AND METHOD FOR MANUFACTURING BALL JOINT ASSEMBLY FOR VEHICLE

(71) Applicant: ILJIN CO., LTD., Gyeongju-si (KR)

(72) Inventors: Hee Mun Jeong, Seoul (KR); Hyun Ho Park, Seoul (KR)

(73) Assignee: ILJIN CO., LTD., Gyeongju-si (KR)

( * ) Notice: Subject to any disclaimer, the term of this patent is extended or adjusted under 35 U.S.C. 154(b) by 0 days.

(21) Appl. No.: 17/113,686

(22) Filed: Dec. 7, 2020

(65) Prior Publication Data
US 2021/0086575 A1 Mar. 25, 2021

Related U.S. Application Data

(63) Continuation of application No. PCT/KR2018/015846, filed on Dec. 13, 2018.

(30) Foreign Application Priority Data

Jun. 8, 2018 (KR) ........................ 10-2018-0066360

(51) Int. Cl.
*B60G 7/00* (2006.01)
*F16C 11/06* (2006.01)

(52) U.S. Cl.
CPC .......... *B60G 7/005* (2013.01); *F16C 11/0633* (2013.01); *B60G 2204/416* (2013.01)

(58) Field of Classification Search
CPC .............. B60G 7/005; B60G 2204/416; B60G 2204/1224; B60G 2206/11;
(Continued)

(56) References Cited

U.S. PATENT DOCUMENTS 4,159,186 A * 6/1979 Funcke .................. B60G 7/005
403/140
4,601,603 A * 7/1986 Nakayama .......... F16C 11/0628
403/143
(Continued)

FOREIGN PATENT DOCUMENTS

GB 2300222 A * 10/1996 .......... F16C 11/0657
JP H06272710 A 9/1994
(Continued)

OTHER PUBLICATIONS

International Search Report of PCT/KR2018/015846 dated Mar. 12, 2019.

*Primary Examiner* — Frank B Vanaman
(74) *Attorney, Agent, or Firm* — Dinsmore & Shohl LLP; Yongsok Choi, Esq.

(57) ABSTRACT

A ball joint assembly for a vehicle includes a mounting part including an inner circumference part forming a hole in a vertical direction; a ball stud including a ball and a stud extending from the ball; a bearing coupled to surround the ball and disposed in the hole; and an insert molding part for filling the space of the hole formed between the inner circumference part and the outer surface of the bearing. The inner circumference part includes at least one upper protruding part protruding from an upper area thereof in a direction toward a central axis of the hole and at least one lower protruding part protruding from a lower area thereof in a direction toward the central axis.

16 Claims, 11 Drawing Sheets

(58) Field of Classification Search
CPC ............ B60G 2206/427; B60G 21/055; B60G 2204/1432; B60G 2204/418; B60G 2206/81012; F16C 11/0633; F16C 2220/04; F16C 2226/76; F16C 11/0657; F16C 11/069; F16C 11/0638; F16C 2208/04; F16C 2326/05; F16C 11/06; B22D 17/22; B29C 45/14
See application file for complete search history.

(56) References Cited

U.S. PATENT DOCUMENTS

| | | | | |
|---|---|---|---|---|
| 4,995,755 | A * | 2/1991 | Hyodo | F16C 11/086 |
| | | | | 403/280 |
| 5,626,433 | A * | 5/1997 | Iwamoto | F16C 7/02 |
| | | | | 403/122 |
| 5,758,986 | A * | 6/1998 | Kraps | F16C 11/069 |
| | | | | 403/138 |
| 6,109,816 | A * | 8/2000 | Iwasaki | F16C 11/0657 |
| | | | | 403/135 |
| 6,941,656 | B2 * | 9/2005 | Michioka | F16C 11/0671 |
| | | | | 29/898.049 |
| 8,870,201 | B2 * | 10/2014 | Kuroda | B29C 45/14008 |
| | | | | 280/93.511 |
| 11,982,309 | B2 * | 5/2024 | Kuroda | F16C 11/0623 |
| 2015/0308490 | A1 * | 10/2015 | Kwon | F16C 11/0695 |
| | | | | 403/135 |
| 2016/0059652 | A1 * | 3/2016 | Weifenbach | B62D 17/00 |
| | | | | 280/124.144 |
| 2019/0291525 | A1 * | 9/2019 | Lee | B60G 7/005 |

FOREIGN PATENT DOCUMENTS

| | | |
|---|---|---|
| JP | 2014109341 A | 6/2014 |
| KR | 100747197 B1 | 8/2007 |
| KR | 1020170067372 A | 6/2017 |
| KR | 1020170099258 A | 8/2017 |

* cited by examiner

FIG. 11A
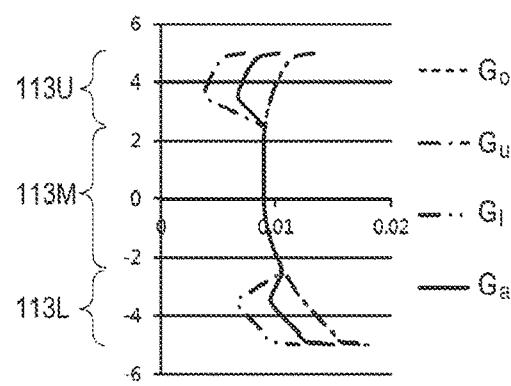
FIG. 11B  FIG. 11C  FIG. 11D  FIG. 11E
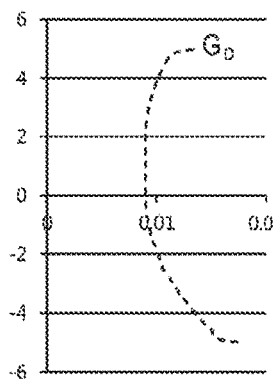 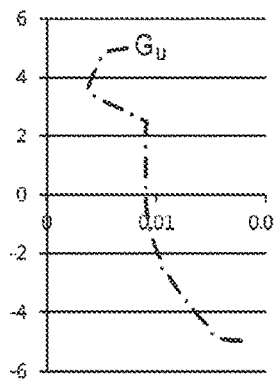 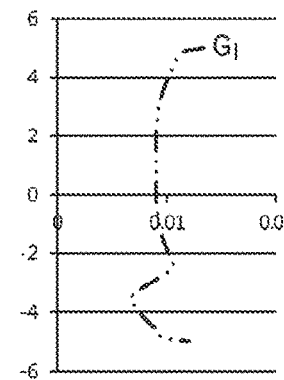 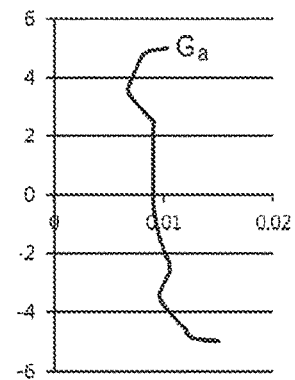

BALL JOINT ASSEMBLY FOR VEHICLE, STABILIZER LINK INCLUDING SAME, AND METHOD FOR MANUFACTURING BALL JOINT ASSEMBLY FOR VEHICLE

CROSS-REFERENCE TO RELATED APPLICATION

This application is a continuation of International Application No. PCT/KR2018/015846 filed on Dec. 13, 2018, which claims priority to Korean Patent Application No. 10-2018-0066360 filed on Jun. 8, 2018, the entire contents of which are herein incorporated by reference.

TECHNICAL FIELD

The present disclosure relates to a ball joint assembly for vehicle. More specifically, the present disclosure relates to a coupling structure of a ball joint assembly for vehicle and a manufacturing method thereof.

BACKGROUND ART

In general, a suspension device for vehicle is a device for connecting a vehicle body and a wheel. The suspension device for vehicle includes a spring for absorbing vibration or impact transferred from a road surface to the vehicle body, a shock absorber for controlling the operation of the spring, and a suspension arm or a suspension link for controlling the operation of the wheel.

Meanwhile, as the type of controlling the operation of the wheel, there is an axle suspension type and an independent suspension type. The independent suspension type includes a swing arm type, a wishbone type, and a MacPherson strut type. Depending on the type of controlling the operation of the wheel, the suspension arm includes a lower arm, an upper arm, a trailing arm, a semi-trailing arm, and the like. The suspension arm connects a knuckle coupled to the wheel to the vehicle body, and enables the knuckle to move up and down with respect to the vehicle body. One end of the suspension arm is connected to the vehicle body so as to rotate in a predetermined range around a rotary shaft extending in forward and backward directions. The other end of the suspension arm is connected to the knuckle via a ball joint.

Meanwhile, a stabilizer bar is mounted on the suspension device to suppress the rolling of the vehicle body (means that the vehicle is tilted to the left or right) and to improve ride comfort. Both end portions of the stabilizer bar are connected to the suspension arm or the shock absorber which moves up and down with the wheel. In general, a middle portion of the stabilizer bar is fixed to the vehicle body. If a difference between heights of both wheels is generated, the both end portions formed to extend in the front-back direction from the middle portion of the stabilizer bar also have a difference in height. This twists the middle part. The stabilizer bar provides a restoring force against the twist, thus suppressing the generation of the height difference of the both wheels.

The end portion of the stabilizer bar is connected to the suspension arm or the shock absorber through a stabilizer link. The stabilizer link has a rod made of a metallic material. One end of the rod is connected to the end portion of the stabilizer bar through a ball joint, and the other end thereof is connected to the suspension arm or the shock absorber through a ball joint. The ball joint has a structure in which a bearing is coupled to a ball stud to surround a ball of the ball stud so that the ball stud is rotatable with respect to a mounting member to which the bearing is fixed.

SUMMARY

Technical Problem

A molding material used for insert molding may shrink when being cooled after insert injection. This may result in a gap between the metallic material and the molding material. In addition, inflow of rainwater or the like into the gap may cause corrosion of the metallic material. This deteriorates strength and durability of a connection structure between the metallic material and the molding material. Further, a gap may be generated between the metallic material and the molding material. Embodiments of the present disclosure provide a ball joint assembly for solving these problems.

Technical Solution

A ball joint assembly for vehicle according to an embodiment of the present disclosure comprises: a mounting part having an inner circumferential portion in which a hole is formed in an up-down direction; a ball stud including a ball and a stud extending from the ball; a bearing coupled to surround the ball and disposed in the hole; and an insert molding part configured to fill a space formed between the inner circumferential portion and an outer surface of the bearing in the hole. The inner circumferential portion includes at least one upper protruded portion which protrudes in a direction toward a central axis of the hole in an upper region, and at least one lower protruded portion which protrudes in the direction toward the central axis in a lower region.

According to an embodiment of the present disclosure, the at least one upper protruded portion and the at least one lower protruded portion may be alternately arranged in a circumferential direction.

According to an embodiment of the present disclosure, the at least one upper protruded portion may include a plurality of upper protruded portions, and the at least one lower protruded portion may include a plurality of lower protruded portions. The plurality of upper protruded portions may be arranged to be spaced apart from each other along a circumferential direction, and the plurality of lower protruded portions may be arranged to be spaced apart from each other along the circumferential direction.

According to an embodiment of the present disclosure, the at least one upper protruded portion and the at least one lower protruded portion, which are adjacent to each other in a circumferential direction, may be arranged to border on each other in the circumferential direction or may be arranged to be spaced apart from each other in the circumferential direction when viewed from the top.

According to an embodiment of the present disclosure, the at least one upper protruded portion and the at least one lower protruded portion may be arranged so as not to overlap each other when viewed from the top.

According to an embodiment of the present disclosure, the insert molding part may fill a gap between a protruded end of the at least one upper protruded portion and the outer surface of the bearing, and may fill a gap between a protruded end of the at least one lower protruded portion and the outer surface of the bearing.

According to an embodiment of the present disclosure, the insert molding part may cover an upper surface of the at least one upper protruded portion and may cover a lower surface of the at least one lower protruded portion.

According to an embodiment of the present disclosure, the insert molding part may be formed by injection. A center of the ball may be positioned inside the hole.

According to an embodiment of the present disclosure, the at least one upper protruded portion may be disposed above the center of the ball, and the at least one lower protruded portion may be disposed below the center of the ball.

According to an embodiment of the present disclosure, on a cross-section taken along the center of the ball in the up-down direction, the outer surface of the bearing may be formed to outermost protrude in a radial outward direction at a position lower than the at least one upper protruded portion and above the at least one lower protruded portion.

According to an embodiment of the present disclosure, the at least one upper protruded portion may extend in a circumferential direction at an angle of 180 degrees or less, and the at least one lower protruded portion may extend in the circumferential direction at the angle of 180 degrees or less.

A stabilizer link according to an embodiment of the present disclosure comprises: a first mounting part having a first inner circumferential portion in which a first hole is formed in a first up-down direction along a first central axis; a first ball stud including a first ball and a first stud extending from the first ball; a first bearing coupled to surround the first ball and disposed in the first hole; a first insert molding part configured to fill a space formed between the first inner circumferential portion and an outer surface of the first bearing in the first hole; and a rod having one end to which the first mounting part is fixed. The first inner circumferential portion includes at least one first upper protruded portion which protrudes in a direction toward the first central axis in a first upper region, and at least one first lower protruded portion which protrudes in the direction toward the first central axis in a first lower region.

According to an embodiment of the present disclosure, the at least one first upper protruded portion and the at least one first lower protruded portion may be alternately arranged in a circumferential direction.

According to an embodiment of the present disclosure, the stabilizer link comprises: a second mounting part having a second inner circumferential portion in which a second hole is formed in a second up-down direction along a second central axis, and provided to be fixed to the other end of the rod; a second ball stud including a second ball and a second stud extending from the second ball; a second bearing coupled to surround the second ball and disposed in the second hole; and a second insert molding part configured to fill a space formed between the second inner circumferential portion and an outer surface of the second bearing in the second hole. The second inner circumferential portion may include at least one second upper protruded portion which protrudes in a direction toward the second central axis in a second upper region, and at least one second lower protruded portion which protrudes in the direction toward the second central axis in a second lower region.

According to an embodiment of the present disclosure, the at least one second upper protruded portion and the at least one second lower protruded portion may be alternately arranged in the circumferential direction.

According to an embodiment of the present disclosure, the first central axis and the second central axis may be in a parallel relationship.

A method of manufacturing a ball joint assembly for vehicle according to an embodiment of the present disclosure may include: a die-casting step of manufacturing a mounting part by die-casting, wherein the mounting part includes a hole formed in an up-down direction, at least one upper protruded portion which protrudes toward a central axis of the hole in an upper region of the hole, and at least one lower protruded portion which protrudes toward the central axis of the hole in a lower region of the hole; a positioning step of positioning a bearing to which a ball stud is coupled in the hole, and disposing an injection mold at the mounting part; and an injection step of forming an insert molding part configured to support the bearing by applying an insert injection into the injection mold so as to fill a space formed between the mounting part and an outer surface of the bearing in the hole.

According to an embodiment of the present disclosure, in the die-casting step, the mounting part may be manufactured by injecting a molten metal into a space formed by an upper die-casting mold and a lower die-casting mold, in a state in which the upper die-casting mold that defines an upper surface of the at least one upper protruded portion and an upper surface of the at least one lower protruded portion and the lower die-casting mold that defines a lower surface of the at least one upper protruded portion and a lower surface of the at least one lower protruded portion are engaged with each other.

According to an embodiment of the present disclosure, the die-casting step may include separating the upper die-casting mold and the lower die-casting mold from each other in upward and downward directions, respectively, after the injected molten metal is solidified.

According to an embodiment of the present disclosure, the at least one upper protruded portion and the at least one lower protruded portion may be alternately formed in a circumferential direction.

Advantageous Effects

According to embodiments of the present disclosure, the mounting part can more stably support the insert molding part, and the insert molding part can more stably support the bearing.

Further, it is possible to remarkably reduce a gap generated between the inner circumferential portion of the mounting part and the insert molding part, thereby significantly increasing the strength and durability of the ball joint assembly.

BRIEF DESCRIPTION OF THE DRAWINGS

FIG. 11A is a graph showing a radial gap (X axis, unit: mm) between the insert molding part and the inner circumferential portion in terms of the vertical position (Y axis, unit: mm) of the inner circumferential portion, when a ratio of a radial shrinkage to a radial thickness of the insert molding part is assumed to be 0.3%.

FIG. 11B is a graph showing a radial gap (X axis, unit: mm) between the insert molding part and the inner circumferential portion in terms of the vertical position (Y axis, unit: mm) of the inner circumferential portion, when a ratio of a radial shrinkage to a radial thickness of the insert molding part is assumed to be 0.3%.

FIG. 11C is a graph showing a radial gap (X axis, unit: mm) between the insert molding part and the inner circumferential portion in terms of the vertical position (Y axis, unit: mm) of the inner circumferential portion, when a ratio of a radial shrinkage to a radial thickness of the insert molding part is assumed to be 0.3%.

FIG. 11D is a graph showing a radial gap (X axis, unit: mm) between the insert molding part and the inner circumferential portion in terms of the vertical position (Y axis, unit: mm) of the inner circumferential portion, when a ratio of a radial shrinkage to a radial thickness of the insert molding part is assumed to be 0.3%.

FIG. 11E is a graph showing a radial gap (X axis, unit: mm) between the insert molding part and the inner circumferential portion in terms of the vertical position (Y axis, unit: mm) of the inner circumferential portion, when a ratio of a radial shrinkage to a radial thickness of the insert molding part is assumed to be 0.3%.

DETAILED DESCRIPTION

Figure 1:
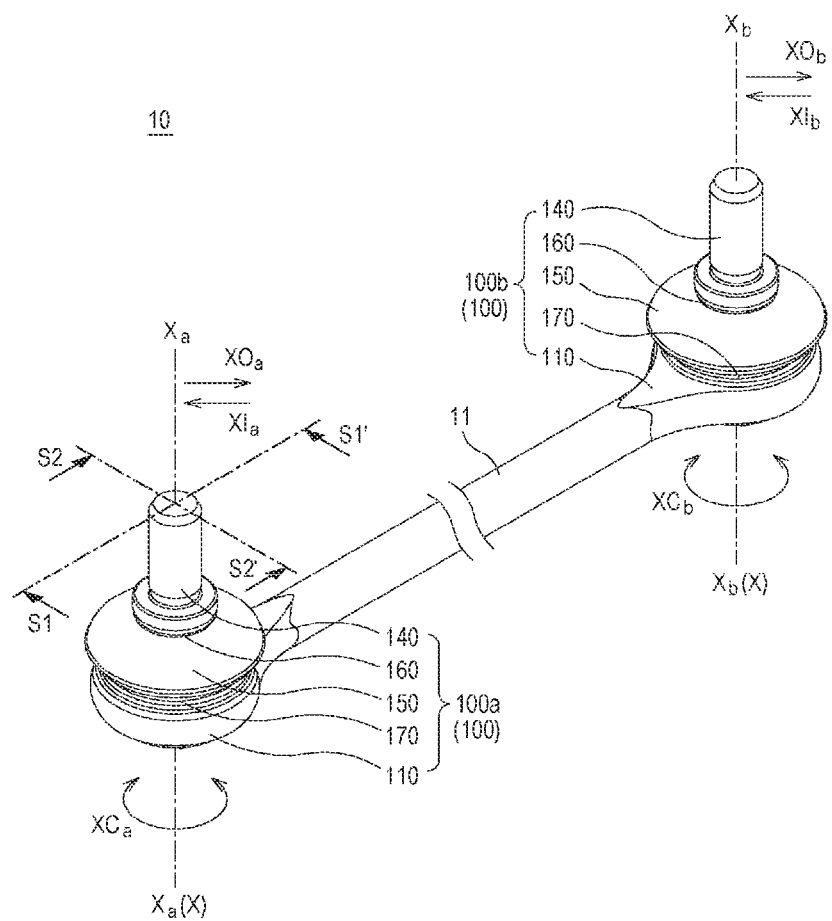
FIG. 1 is a perspective view of a stabilizer link according to one embodiment of the present disclosure.

Embodiments of the present disclosure are exemplified for the purpose of describing the technical spirit of the present disclosure. The scope of the claims according to the present disclosure is not limited to the embodiments described below or to the detailed descriptions of these embodiments.

Unless otherwise defined, all technical and scientific terms used herein have the same meaning commonly understood by those skilled in the art to which the present disclosure pertains. All terms used herein are selected for the purpose of more clearly describing the present disclosure and not limiting the scope of the present disclosure defined by appended claims.

Unless the phrase or sentence clearly indicates otherwise, the terms "comprising", "including", "having" and the like used herein should be construed as open-ended terms encompassing the possibility of including other embodiments.

The singular form described herein may include the plural form unless the context clearly dictates otherwise, and this is equally applied to the singular form set forth in the claims.

The terms "first," "second," and the like are used to distinguish a plurality of components, and the order or importance of corresponding components is not limited by these terms. Further, unless otherwise defined in the present disclosure, a component following the term "first" will be referred to as a component of a first ball joint assembly 100a, and a component following the term "second" will be referred to as a component of a second ball joint assembly 100b.

Directional directives of "upward", "above" and the like used in describing a vehicle ball joint assembly 100 according to the present disclosure mean directions in which a stud 143 protrudes in an extension direction of a hole 110h of a mounting part 110 of the ball joint assembly 100, directional directives of "downward", "below" and the like mean directions opposite the above "upward", "above" directions. The ball joint assembly 100 shown in the accompanying drawings may be arranged in directions different from the above directions, and the directional indicatives may be read on the different directions.

As shown in FIG. 1, in a case in which both the first ball joint assembly 100a and the second ball joint assembly 100b are illustrated, the up-down direction of the first ball joint assembly 100a may be referred to as a first up-and-down direction, and the up-down direction of the second ball joint assembly 100b may be referred to as a second up-and-down direction. In FIG. 1, the first up-down direction and the second up-down direction are the same. However, according to the arrangement of each of the ball joint assemblies 100a and 100b, the first up-down direction and the second up-down direction may be different from each other, for example, different directions or directions perpendicular to each other.

The term "central axis X" used in describing the vehicle ball joint assembly 100 of the present disclosure means an axis passing through a hole 110h in the extension direction of the hole 110h of the mounting part 110. Here, the central axis X is a virtual axis for the purpose of describing the present disclosure and does not mean the actual part of the apparatus. Further, as used in describing the ball joint assembly 100 of the present disclosure, the term "radial outward direction XO" means a direction away from the central axis X of the ball joint assembly 100, and the term "radial inward direction XI" means a direction approaching the central axis X (direction toward the central axis X), and the term "circumferential direction XC" means a direction of rotating about the central axis X.

In a case in which both the first ball joint assembly 100a and the second ball joint assembly 100b are illustrated as shown in FIG. 1, the central axis X of the first ball joint assembly 100a may be referred to as a first central axis Xa, and the central axis X of the second ball joint assembly 100b may be referred to as a second central axis Xb. A radial outward direction XOa, a radial inward direction XIa, and a circumferential direction XCa of the first ball joint assembly 100a are defined with reference to the first central axis Xa, and a radial outward direction XOb, a radial inward direction XIb, and a circumferential direction XCb of the second ball joint assembly 100b are defined with respect to the second central axis Xb. Although the first central axis Xa and the second central axis Xb are shown as being parallel to each other in FIG. 1, the central axis Xa and the central axis Xb may be in a relationship other than the parallel relationship, for example, a vertical relationship, depending on the arrangement of the first and second ball joint assemblies 100a and 100b.

Hereinafter, embodiments will be described with reference to the accompanying drawings. In the accompanying drawings, the same reference numerals are assigned to the same or corresponding components. Further, in the following descriptions of the embodiments, duplicate descriptions of the same or corresponding components may be omitted. However, even though a description of a component is omitted, such a component is not intended to be excluded in any embodiment.

The vehicle ball joint assembly 100 according to the present disclosure may be used as a ball joint connection structure between two members, such as a connection structure between a suspension arm and a knuckle, a connection structure between a stabilizer bar and a stabilizer link 10, a connection structure between the stabilizer link 10 and the suspension arm or a shock absorber, or the like. Hereinafter, the ball joint assembly 100 according to the present embodiment will be described as a structure for connecting the stabilizer link 10 and another external member (for example, the stabilizer bar, the suspension arm, or the shock absorber). However, the vehicle ball joint assembly 100 according to the present disclosure is not necessarily limited thereto.

The stabilizer link 10 and another external member may be connected to each other via the ball joint assembly 100. For example, the stabilizer link 10 and the stabilizer bar may be connected to each other via the ball joint assembly 100. Further, for example, the stabilizer link 10 and the shock absorber or the suspension arm may be connected to each other via the ball joint assembly 100. Here, the suspension arm may be configured in different fashions depending on the type of a suspension apparatus. The stabilizer link 10 may be connected to a lower arm, an upper arm or a trailing arm via the ball joint assembly 100.

The mounting part 110 of the ball joint assembly 100 according to the present embodiment is shown to be fixed to a rod 11 of the stabilizer link 10, but is not necessarily limited thereto. For example, the mounting part 110 may be fixed to the another member. In addition, a pair of ball joint assemblies are arranged at both ends of the stabilizer link 10 in the present embodiment, but is not necessarily limited thereto. In some embodiments, the ball joint assembly may be disposed in one of the both ends of the stabilizer link 10. In some embodiments, the ball joint assembly may be disposed in another member outside the stabilizer link rather than being disposed on the stabilizer link.

Referring now to FIG. 1, the stabilizer link 10 according to one embodiment of the present disclosure will be described. FIG. 1 is a perspective view of the stabilizer link 10 according to one embodiment of the present disclosure.

The stabilizer link 10 includes the rod 11 extending to connect one end and the other end of the stabilizer link 10. The stabilizer link 10 includes the first ball joint assembly 100a disposed at one end of rod 11. The stabilizer link 10 may further include the second ball joint assembly 100b disposed at the other end of the rod 11. A first mounting part 110 of the first ball joint assembly 100a may be fixed to the one end of the rod 11. A second mounting part 110 of the second ball joint assembly 100b may be fixed to the other end of the rod 11.

The one end of the stabilizer link 10 is configured to be connected to an external stabilizer bar, and the other end thereof is configured to be connected to an external suspension arm or an external shock absorber. One of the first ball joint assembly 100a and the second ball joint assembly 100b is configured to connect the stabilizer link 10 and the stabilizer bar, and the other is configured to connect the stabilizer link 10 and the suspension arm or the shock absorber.

The first mounting part 110 forms a first hole 110h in the first up-down direction along the first central axis Xa. The second mounting part 110 forms a second hole 110h in the second up-down direction along the second central axis Xb.

The first central axis Xa and the second central axis Xb may be disposed in a parallel relationship. With this configuration, the rod 11, the first mounting part 110, and the second mounting part 110 can be integrally manufactured by only two die-casting molds including an upper die-casting mold and a lower die-casting mold. This is convenient and economic. If the first central axis Xa and the second central axis Xb are not parallel, a direction (the first up-down direction) in which a first upper die-casting mold and a first lower die-casting mold that define the outer shape of the first mounting part 110 are separated from each other, and a direction (the second up-down direction) in which a second upper die-casting mold and a second lower die-casting mold that define the outer shape of the second mounting part 110 are separated from each other are different. As such, at least four die-casting molds are required.

Hereinafter, each component of the ball joint assembly 100 will be described as each of the first and second ball joint assemblies 100a and 100b.

Referring to FIG. 1, the ball joint assembly 100 includes the mounting part 110 fixed to the rod 11, a bearing 130 supported by the mounting part 110, and a ball stud 140 coupled to the bearing 130. The ball stud 140 includes a ball 141, and a stud 143 extending from the ball 141. The bearing 130 is disposed in the hole 110h formed in the mounting part 110.

The ball joint assembly 100 may include a dust cover 150 that prevents inflow of foreign substances. In addition, the ball joint assembly 100 may include an upper fixing member 160 for fixing the dust cover 150 and a lower fixing member 170.

Figure 2:
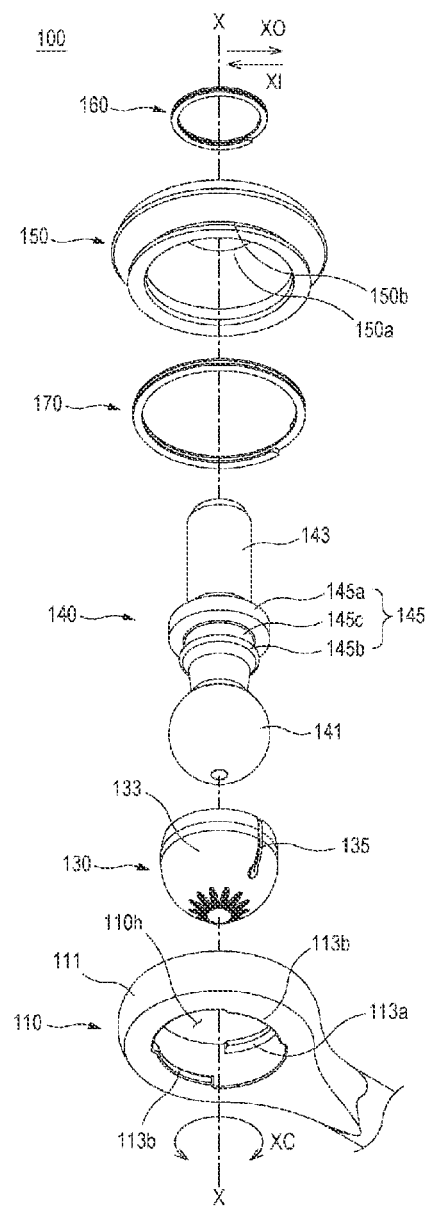
FIG. 2 is an exploded perspective view of a ball joint assembly of FIG. 1, except for an insert molding part.

FIG. 2 is an exploded perspective view of the ball joint assembly 100 of FIG. 1, in which an insert molding part 120 is not shown.

Referring to FIG. 2, the ball joint assembly 100 includes the mounting part 110 that forms the hole 110h in a vertical direction along the central axis X. The mounting part 110 includes a frame portion 111 that forms a frame along the circumference of the hole 110h. The frame portion 111 may have a ring-shaped structure formed to extend along the circumferential direction XC. The frame portion 111 may be fixed to the one end of the rod 11.

The mounting part 110 includes an inner circumferential portion 113 that forms the hole 110h in the vertical direction. The inner circumferential portion 113 is disposed in the radial inward direction XI of the frame portion 111. At least one upper protruded portion 113a is formed in an upper region of the inner circumferential portion 113, and at least one lower protruded portion 113b is formed in a lower region of the inner circumferential portion 113.

A slit portion 135 is formed in the bearing 130. A pair of slit portions 135 may be disposed on opposite sides of an outer surface 133. The slit portion 135 is formed to extend downward from the upper end of the bearing 130 by a predetermined distance. In the course of coupling the bearing 130 and the ball 141, the slit portion 135 is widen so that the ball 141 can be inserted into the bearing 130. When the ball 141 is positioned inside the bearing 130, the slit portion 135 is narrowed, thereby stably performing the function of the bearing 130.

Figure 3:
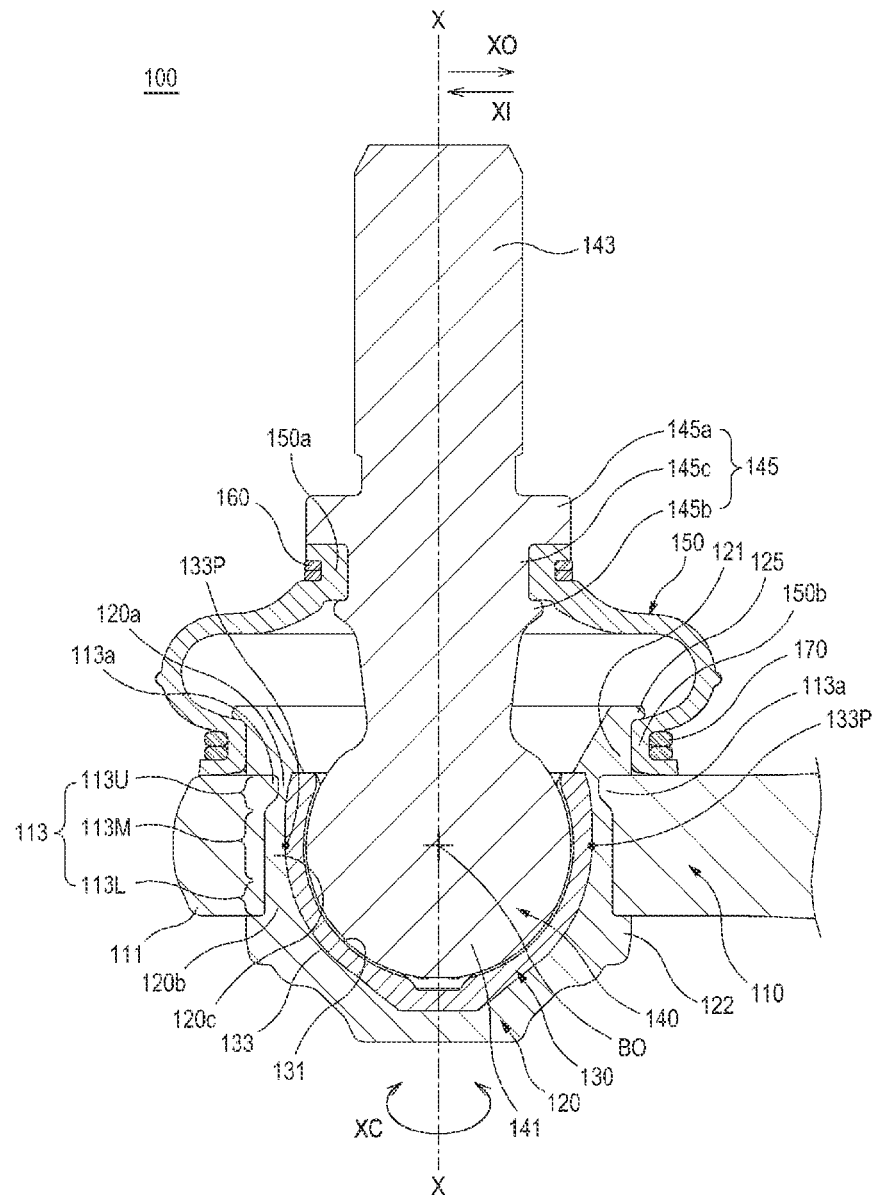
FIG. 3 is a vertical cross-sectional view of the ball joint assembly, which is taken along line S1-S1' in FIG. 1.
Figure 4:
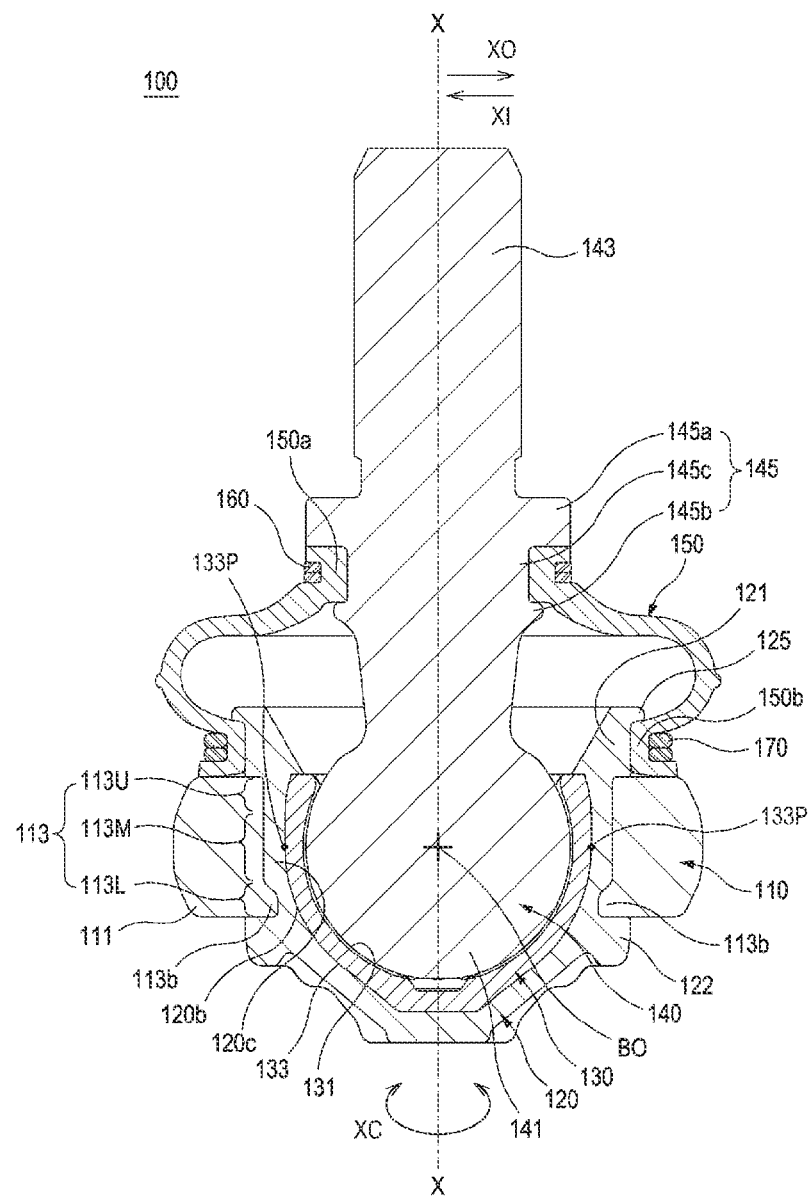
FIG. 4 is a vertical cross-sectional view of the ball joint assembly, which is taken along line S2-S2' in FIG. 1.

FIG. 3 is a vertical cross-sectional view of the ball joint assembly 100 of FIG. 1, which is taken along line S1-S1'. FIG. 4 is a vertical cross-sectional view of the ball joint assembly 100 of FIG. 1, which is taken along line S2-S2'.

Referring to FIGS. 3 and 4, the inner circumferential portion 113 includes an upper region 113U, a middle region 113M, and a lower region 113L, which are sequentially arranged downward from above. The upper protruded portion 113a protrudes in the radial inward direction XI at the upper region 113U. The lower protruded portion 113b protrudes in the radial inward direction XI at the lower region 113L. The middle region 113M forms an inner diameter surface away from the central axis X than a protruded end of the upper protruded portion 113a and a protruded end of the lower protruded portion 113b.

In addition, the ball joint assembly 100 includes the insert molding part 120 that fills a space formed between the inner circumferential portion 113 and an outer surface 133 of the bearing 130 in the hole 110h. The insert molding part 120 supports the bearing 130.

The insert molding part 120 may be formed by injection mold. The insert molding part 120 may be formed of a material having a higher stiffness than that of the bearing 130. For example, the insert molding part 120 may be formed by inject a glass fiber reinforced plastic (GFRP) material. In the present embodiment, the insert molding part 120 is formed of the GFRP in which 50% of a glass fiber (GF) component is contained in a nylon resin (PA6).

The insert molding part 120 may be filled between the protruded end of the upper protruded portion 113a and the outer surface 133 of the bearing 130. The insert molding part 120 includes an upper engagement portion 120a that fills between the upper region 113U of the inner circumferential portion 113 and the outer surface 133 of the bearing 130. The upper engagement portion 120a covers the protruded end of the upper protruded portion 113a. The upper engagement portion 120a covers both sides of the upper protruded portion 113a in the circumferential direction.

The insert molding part 120 may be filled between the protruded end of the lower protruded portion 113b and the outer surface 133 of the bearing 130. The insert molding part 120 includes a lower engagement portion 120b that fills between the lower region 113L of the inner circumferential portion 113 and the outer surface 133 of the bearing 130. The lower engagement portion 120B covers the protruded end of the lower protruded portion 113b. The lower engagement portion 120b covers both sides of the lower protruded portion 113b in the circumferential direction.

The insert molding part 120 includes a middle engagement portion 120c that fills between the middle region 113M of the inner circumferential portion 113 and the outer surface 133 of the bearing 130. The middle engagement portion 120c covers the lower surface of the upper protruded portion 113a. The middle engagement portion 120c covers the upper surface of the lower protruded portion 113b.

The insert molding part 120 includes an upper cover portion 121 that covers the upper surface of the upper protruded portion 113a. The upper cover portion 121 may cover the upper end of the upper region 113U. A lower surface of the upper cover portion 121 and a surface oriented in the radial outward direction XO in the upper engagement portion 120a form an upper locking portion (not shown). An upper edge of the inner circumferential portion 113 is engaged with the upper locking portion.

The insert molding part 120 includes a lower cover portion 122 that covers a lower surface of the lower protruded portion 113b. The lower cover portion 122 may cover the lower end of the lower region 113L. An upper surface of the lower cover portion 122 and a surface oriented in the radial outward direction XO in the lower engagement portion 120b form a lower locking portion (not shown). A lower edge of the inner circumferential portion 113 is engaged with the lower locking portion.

The upper engagement portion 120a, the lower engagement portion 120b, the middle engagement portion 120c, the upper cover portion 121, and the lower cover portion 122 are engaged with various convex-concave portions formed in the inner circumferential portion 113. Thus, breakdown strength of the coupling structure of the insert molding part 120 and the inner circumferential portion 113 with respect to a rotational torque, a vertical load, a lateral load, and the like, may be further improved.

On the other hand, the ball stud 140 includes the ball 141 disposed below, and the stud 143 extending upward from the ball 141. The ball 141 is formed in a spherical shape as a whole. The ball stud 140 may be configured to rotate about the center BO of the ball 141 relative to the bearing 130. The center BO of the ball 141 is defined in the hole 110h.

Meanwhile, the ball joint assembly 100 may include the bearing 130 coupled to surround the ball 141. The bearing 130 may be formed by injection molding. For example, the bearing 130 may be formed by injecting an acetal plastic (POM) material. The bearing 130 may be separately manufactured by the injection molding and then coupled to the ball stud 140.

The bearing 130 has an inner surface 131 with which the ball 141 is slidably in contact. The inner surface 131 is substantially an inwardly-curved spherical surface in conformity with the shape of the ball 141. The bearing 130 also has the outer surface 133 which is in contact with the insert molding part 120 to be fixed to the insert molding part 120. The outer surface 133 may be substantially an outwardly-curved spherical surface.

On the other hand, as the thickness of the portion formed by the insert injection increases, more shrinkage may occur. As such, a variation in the amount of shrinkage may occur depending on the thickness of each portion formed by the insert injection. In a Comparative example different from an embodiment of the present disclosure, among portions of an insert molding part positioned in a hole of a mounting part, an upper portion and a lower portion are relatively thick and an intermediate portion is relatively thin. As a result, the upper portion and the lower portion may undergo more shrinkage in the radial direction than the intermediate portion. Accordingly, in the Comparative example, when a lateral load is applied to the insert molding part, the outer surface of the intermediate portion of the insert molding part comes into contact with an inner circumferential surface of the hole before the upper and lower portions so that the lateral load may be intensively applied to the intermediate portion.

By the upper protruded portion 113a and the lower protruded portion 113b of the present disclosure, the deviation in thickness of portions disposed in the hole of the insert molding part is reduced, which makes it possible to remarkably reduce a risk that a portion of the insert molding part is subjected to the intensive load due to the shrinkage deviation.

For example, the upper protruded portion 113a may be disposed above the center BO, and the lower protruded portion 113b may be disposed below the center BO. This makes it possible to reduce the shrinkage deviation during the injection molding of the bearing 130 according to the position of the bearing 130.

For example, in a cross-section that vertically crosses the center BO of the ball, the outer surface 133 of the bearing 130 may be formed to outermost protrude in the radial outward direction XO at a position below the upper protruded portion 113a and above the lower protruded portion 113b. The outermost portion 133P is a portion protruding supremely from the outer surface 133 of the bearing 130 in the radial outward direction XO. Accordingly, it is possible to reduce the shrinkage deviation during the injection molding of the bearing 130 according to the position of the bearing 130.

When the bearing 130 is formed to surround the ball 141 at a constant thickness, the outermost portion 133P is disposed to supremely protrude from the outer surface 133 of the bearing 130 on a horizontal plane crossing the center BO of the ball 141. The upper protruded portion 113a may be disposed above the outermost portion 133P, and the lower protruded portion 113b may be disposed below the outermost portion 133P.

Meanwhile, the ball joint assembly 100 may include the dust cover 150 configured to prevent foreign materials from being introduced into the boundary between the bearing 130 and the ball 141. The dust cover 150 extends in the circumferential direction to surround the ball stud 140 circumferentially. The dust cover 150 includes a cover upper fixing portion 150a disposed at an upper portion thereof, and a cover lower fixing portion 150b disposed at a lower portion thereof. The cover upper fixing portion 150a may be fixed by the upper fixing member 160 while being in contact with the upper fixing portion 145 of the ball stud 140. The cover lower fixing portion 150b may be fixed by the lower fixing member 170 while being in contact with a lower fixing portion 125 formed on the upper portion of the insert molding part 120.

The ball joint assembly 100 may include the upper fixing member 160 configured to fix an upper portion of the dust cover 150, and the lower fixing member 170 configured to fix a lower portion of the dust cover 150. Each of the upper fixing member 160 and the lower fixing member 170 may be configured as a ring clip.

The upper fixing portion 145 may have a groove portion 145c formed to receive the cover upper fixing portion 150a therein. The groove portion 145c may extend in the circumferential direction XC to be recessed in the radial inward direction XI. The cover upper fixing portion 150a is disposed in the groove portion 145c. The upper fixing portion 145 may have a first upper rib 145a that forms an upper end of the groove portion 145c, and a second upper rib 145b that forms a lower end of the groove portion 145c.

The lower fixing portion 125 protrudes from an upper end portion of the insert molding part 120 in the radial outward direction XO and extends in the circumferential direction. The cover lower fixing portion 150b is locked to the lower fixing portion 125. A groove recessed in the radial inward direction XI by the lower surface of the lower fixing portion 125 and the upper surface of the mounting part 110 is formed. The cover lower fixing portion 150b is disposed in the groove.

Figure 5:
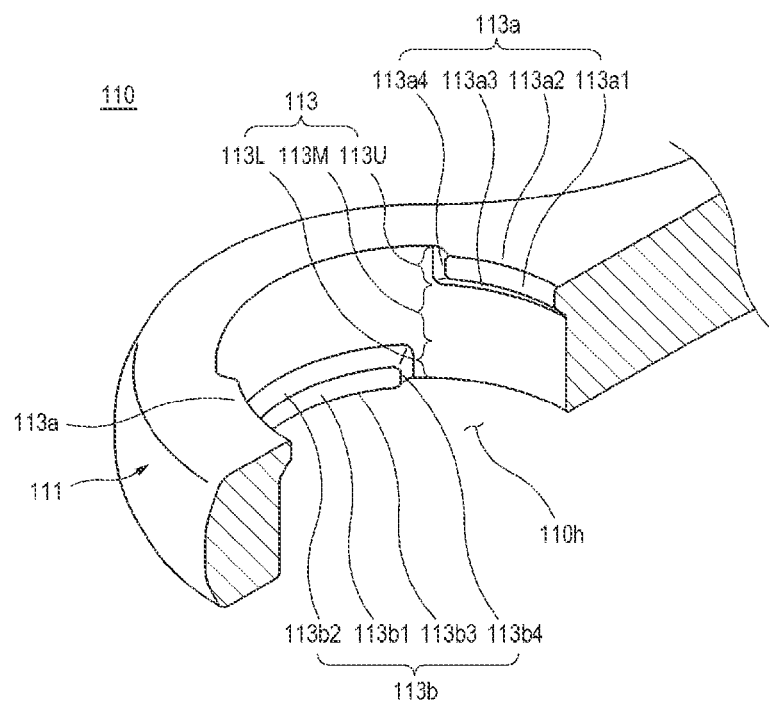
FIG. 5 is a vertical cross-sectional perspective view of a mounting part, which is taken along line S1-S1' in FIG. 1.
Figure 6:
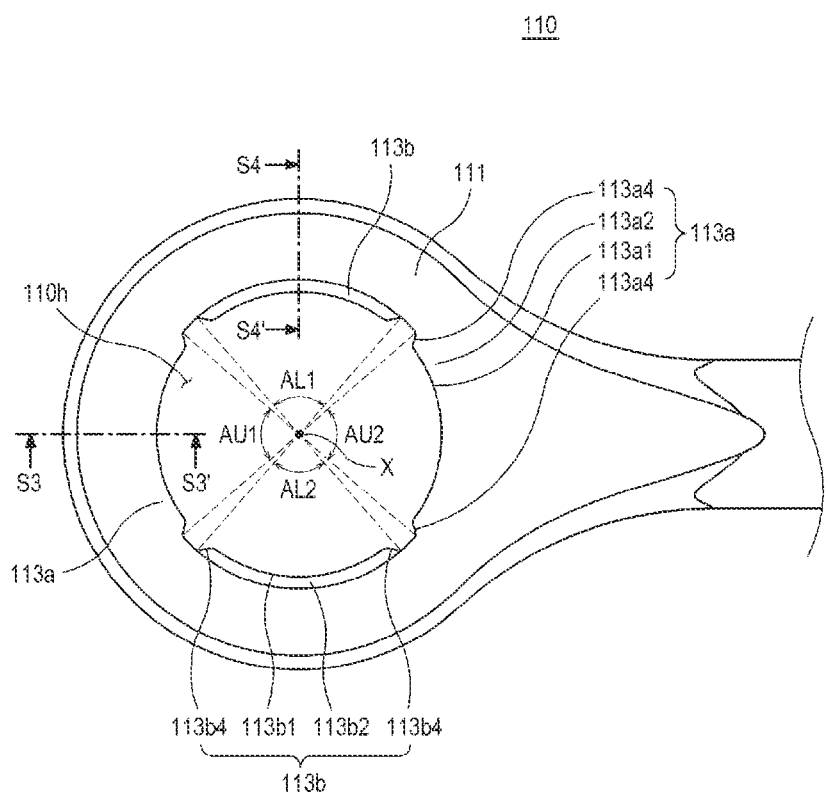
FIG. 6 is an elevation view of the mounting part of FIG. 1 when viewed from the top.

Hereinafter, the upper protruded portion 113a and the lower protruded portion 113b will be described in more detail with reference to FIGS. 5 and 6. FIG. 5 is a vertical cross-sectional perspective view of the mounting part 110 of FIG. 1, which is taken along line S1-S1'. FIG. 6 is an elevation view of the mounting part 110 of FIG. 1 when viewed from the top.

Referring to FIG. 5, the upper protruded portion 113a protrudes from the upper region 113U in the radial inward direction XI. The upper protruded portion 113a has a protruded end 113a1 oriented in the radial inward direction XI, an upper surface 113a2 connected to an upper side of the protruded end 113a1, and a lower surface 113a3 connected to a lower surface of the protruded end 113a1. In addition, the upper protruded portion 113a has a pair of side surfaces 113a4 disposed on both sides of the protruded end 113a1 in the circumferential direction.

The lower protruded portion 113b protrudes in the radial inward direction XI at the lower region 113L. The lower protruded portion 113b has a protruded end 113b1 oriented in the radial inward direction XI, an upper surface 113b2 connected to an upper end of the protruded end 113b1, and a lower surface 113b3 connected to a lower end of the protruded end 113b1. In addition, the lower protruded portion 113b has a pair of side surfaces 113b4 disposed on both sides of the protruded end 113b1 in the circumferential direction.

Referring to FIG. 6, a plurality of upper protruded portions 113a may be provided. Further, a plurality of lower protruded portions 113b may be provided. The number of upper protruded portions 113a and the number of lower protruded portions 113b may be the same.

The plurality of upper protruded portions 113a may be spaced apart from each other along the circumferential direction, and the plurality of lower protruded portions 113b may be spaced apart from each other along the circumferential direction. The plurality of upper protruded portions 113a may be arranged along the circumferential direction on the same horizontal plane. The plurality of lower protruded portions 113b may be arranged along the circumferential direction on the same horizontal plane. Meanwhile, unlike the embodiment of the present disclosure, if the upper protruded portion 113a and the lower protruded portion 113b are formed to extend 360 degrees in the circumferential direction, the stability of the coupling structure with respect to the rotational torque of the insert molding part 120 cannot be obtained at the same level as the present embodiment. In addition, the volume of the insert molding part 120 may be excessively decreased unnecessarily, which results in deterioration in Pull-out performance and Push-out performance with respect to the vertical load applied to the insert molding part 120. The terms "Pull-out performance" and "Push-out performance" used herein mean a performance of how much the insert molding part 120 can withstand so as not to be separated from the mounting part 110 when load is applied to the insert molding part 120 in upward and downward directions.

The upper protruded portion and the lower protruded portion may be alternately arranged in the circumferential direction. Such a configuration makes it possible to stably withstand the lateral load applied to the insert molding part 120 in various directions.

The upper protruded portion 113a and the lower protruded portion 113b, which are adjacent to each other in the circumferential direction, may be arranged to border on each other in the circumferential direction or may be arranged to be spaced apart from each other in the circumferential direction when viewed from the top. That is, when viewed from the top, the upper protruded portion 113a and the lower protruded portion 113b may not be overlapped with each other. In this embodiment, a gap is formed between the side surface 113a4 of the upper protruded portion 113a and the side surface 113b4 of the lower protruded portions 113B, which are adjacent to each other in the circumferential direction. With this configuration, convenience and economy can be improved when manufacturing the mounting part 110 by the die-casting, which will be described below.

The upper protruded portion 113a may extend at an angle of 180 degrees or less in the circumferential direction. The two upper protruded portions 113a shown in the example of FIG. 6 extend at an angle AU1 and AU2 of 180 degrees or less in the circumferential direction, respectively. Further, the sum of the angles AU1 and AU2 at which each of the plurality of upper protruded portions 113a extends in the circumferential direction may be 180 degrees or less.

The lower protruded portion 113b may extend in the circumferential direction at an angle of 180 degrees or less. The two lower protruded portions 113b shown in the example of FIG. 6 extend at angles AL1 and AL2 of 180 degrees or less in the circumferential direction, respectively. More preferably, the sum of the angles AL1 and AL2 at which each of the plurality of lower protruded portions 113b extends in the circumferential direction may be 180 degrees or less.

The upper protruded portion 113a may extend in the circumferential direction at an angle of about 10 degrees to 90 degrees. The lower protruded portion 113b may extend in the circumferential direction at an angle of about 10 degrees to 90 degrees. In one embodiment described with reference to FIG. 6, each of the two upper protruded portions 113a extends in the circumferential direction at an angle of about 75 degrees to 85 degrees. In another embodiment described with reference to FIG. 7, each upper protruded portion 113a may extend in the circumferential direction at an angle of about 10 degrees to 30 degrees.

Figure 7:
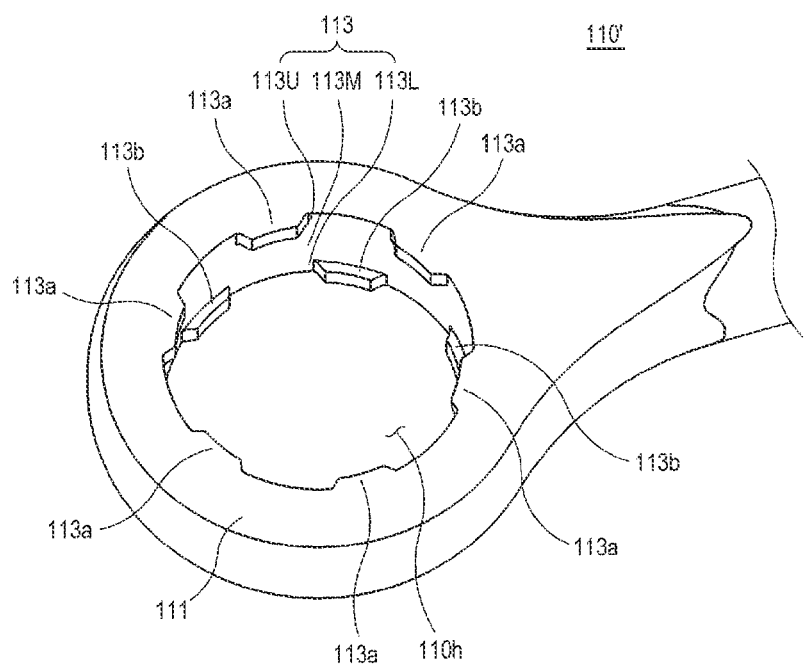
FIG. 7 is a perspective view of a mounting part according to another embodiment.

Next, a mounting part 110' according to another embodiment will be described with reference to FIG. 7. The mounting part 110' according to another embodiment of the present invention includes a plurality of upper protruded portions 113a, each of which extends in the circumferential direction at an acute angle, and a plurality of lower protruded portions 113b, each of which extends in the circumferential direction by an acute angle, respectively. In the mounting part 110 according to one embodiment, the number of upper protruded portions 113a and the number of lower protruded portions 113a are two, respectively. In the mounting part 110' according to another embodiment, the number of upper protruded portions 113a and the number of lower protruded portions 113a are six, respectively. However, the number of upper protruded portions 113a and the number of lower protruded portions 113a are not necessarily limited to these embodiments.

Figure 8:
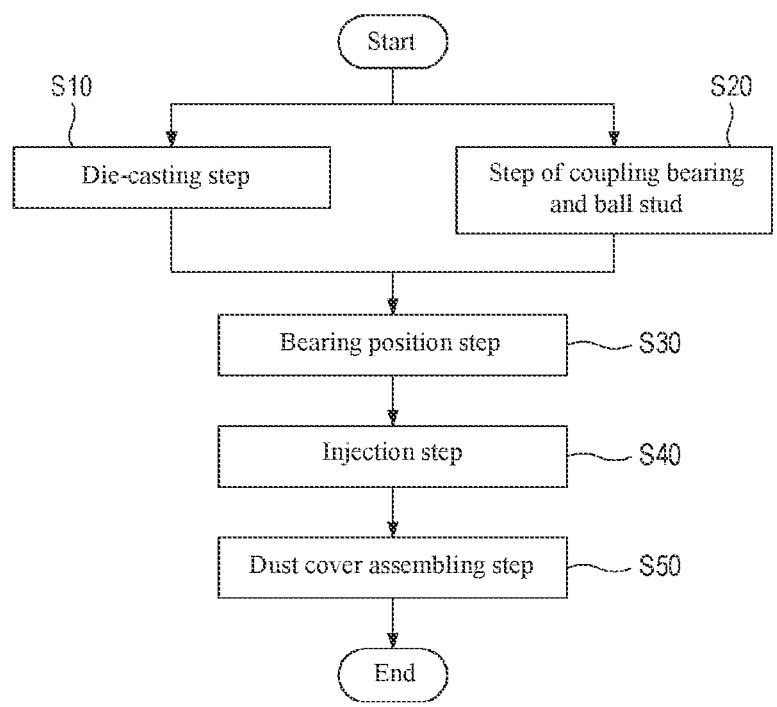
FIG. 8 is a flowchart of a ball joint assembly manufacturing method according to one embodiment of the present disclosure.

Next, a method of manufacturing the ball joint assembly will be described with reference to a flowchart of FIG. 8. In the flowchart of FIG. 8, a die-casting step S10 and a coupling step S20, which are shown to be in a parallel relationship, may be performed in any suitable sequence. For example, the die-casting step S10 and the coupling step S20 may be performed in a simultaneous manner or in a non-simultaneous manner. Alternatively, one of the die-casting step S10 and the coupling step S20 may be performed earlier than the other.

The manufacturing method includes the die-casting step S10 of manufacturing the mounting part 110 by die-casting. Wherein, the mounting part 110 includes a hole (110h) in the vertical direction, at least one upper protruded portion 113a protruding toward the central axis X of the hole 110h in the upper region of the hole 110h, and at least one lower protruded portion 113b protruding toward the central axis X in the lower region of the hole 110h. In the mounting part 110, the at least one upper protruded portion 113a and the at least one lower protruded portion 113b may be alternately formed in the circumferential direction.

The manufacturing method includes the coupling step S20 of coupling the bearing 130 and the ball stud 140. Before the coupling step S20, the bearing 130 is formed by injection and the ball stud 140 is manufactured.

The manufacturing method includes a positioning step S30 of positioning the bearing 130 to which the ball stud 140 is coupled, in the hole 110h of the mounting part 110, and disposing an injection mold 230 at the mounting part 110. The positioning step S30 may be performed after the die-casting step S10 and the coupling step S20.

The manufacturing method includes an injection step S40 of performing an insert-injection by the injection mold 230 to fill the space of the hole 110h formed between the mounting part 110 and the outer surface of the bearing 130. The injection step S40 forms the insert molding part 120 for supporting the bearing 130 by the insert-injection. The injection step S40 may be performed after the positioning step S30.

The manufacturing method may further include an assembling step S50 of assembling the dust cover 150 to the ball stud 140 and the insert molding part 120 after the injection step S40. In the assembling step S50, the dust cover 150 may be assembled at a respective position using the upper fixing member 160 and the lower fixing member 170.

Figure 9A:
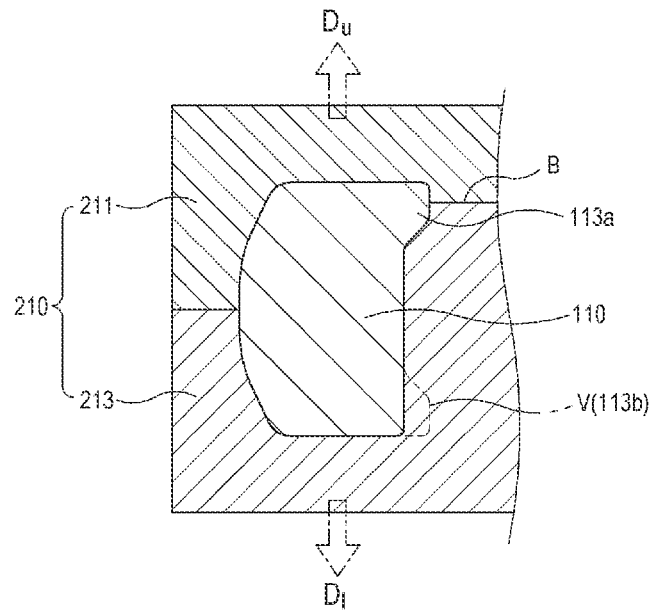
FIG. 9A is a view showing how to manufacture a mounting part using a die-casting molding device in a die-casting step of FIG. 8.
Figure 9B:
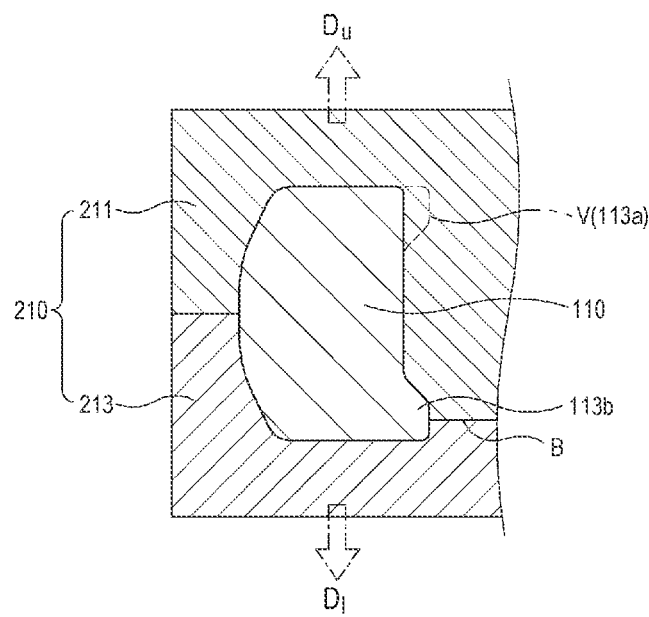
FIG. 9B is a view showing how to manufacture a mounting part using a die-casting molding device in a die-casting step of FIG. 8.

Next, the die-casting step S10 and a die-casting molding device 210 will be described in detail with reference to FIGS. 9A and 9B. FIG. 9A is a partial cross-sectional view of the die-casting molding device 210 and the mounting part 110 taken along line S3-S3' in FIG. 6. FIG. 9B is a partial cross-sectional view of the die-casting molding device 210 and the mounting part 110 taken along line S4-S4' in FIG. 6.

The die-casting molding device 210 includes an upper die-casting mold 211 for defining one side of the mounting part 110, and a lower die-casting mold 213 for defining the other side of the mounting part 110. The upper die-casting mold 211 defines an upper side of the mounting part 110, and the lower die-casting mold 213 defines a lower side of the mounting part 110. The upper die-casting mold 211 defines the upper surface of the upper protruded portion 113a and the upper surface of the lower protruded portion 113b. The lower die-casting mold 213 defines the lower surface of the upper protruded portion 113a and the lower surface of the lower protruded portion 113b.

In the die-casting step S10, the mounting part 110 may be manufactured by injecting a molten metal into a space formed between the upper die-casting mold 211 and the lower die-casting mold 213 in a state in which the upper die-casting mold 211 and the lower die-casting mold 213 are engaged with each other.

In the die-casting step S10, after the injected molten metal is solidified, the upper die-casting mold 211 and the lower die-casting mold 213 can be separated from each other in an up direction Du and a down direction Dl, respectively. To this end, the upper die-casting mold 211 and the lower die-casting mold 213 may form a boundary B at a position where the upper protruded portion 113a is disposed, and form a boundary B at a position where the lower protruded portion 113b is disposed. With this configuration, it is possible to form the mounting part 110 having the upper protruded portion 113a and the lower protruded portion 113b merely using the two die-casting molds 211 and 213. Thus, the manufacturing method using the die-casting improves convenience and economy.

Preferably, the upper protruded portion and the lower protruded portion are not overlapped with each other when viewed from the top. If a lower protruded portion V (113*b*) is disposed below the upper protruded portion 113*a* in FIG. 9A, the lower die-casting mold 213 cannot be separated downward. As a result, a greater number of die-casting molds are required. Similarly, if the upper protruded portion V (113*a*) is disposed above the lower protruded portion 113*b* in FIG. 9B, the upper die-casting mold 211 cannot be separated upward. As a result, a greater number of die-casting molds are required.

Figure 10:
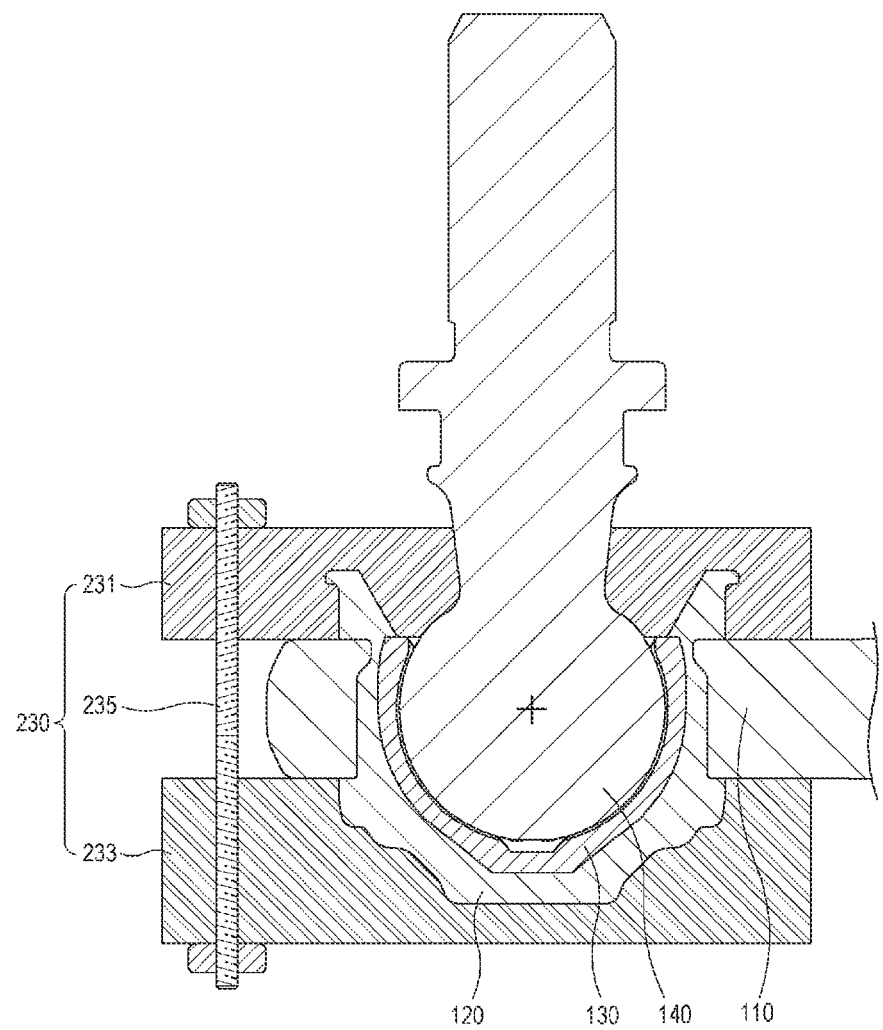
FIG. 10 is a cross-sectional view showing how to manufacture the insert molding part by an injection mold in an injection step of FIG. 8.

Next, the injection step S40 and the injection mold 230 will be described in detail with reference to FIG. 10. FIG. 10 is a partial cross-sectional view of the injection mold 230 and the ball joint assembly 100 taken along line S1-S1' in FIG. 1.

The injection mold 230 includes an upper mold 231 for defining an upper portion of the insert molding part 120, and a lower mold 233 for defining a lower portion of the insert molding part 120. The upper mold 231 may have two or more separable mold parts (not shown). The upper mold 231 and the lower mold 233 may be fixed to the mounting part 110 by a coupling member 235.

In the state where the upper mold 231 and the lower mold 233 are disposed in the mounting part 110, a resin may be injected into a space formed by the hole 110*h* and the injection mold 230 to form the insert molding part 120. Before the insert molding part 120 is cured, the ball stud 140 may be supported by the upper mold 231.

Next, a size of the gap between the inner circumferential portion 113 of the mounting part 110 and the insert molding part 120 will be described with reference to FIGS. 11A to 11E. FIGS. 11A to 11E are graphs showing the size of the radial gap between the insert molding part 120 and the inner circumferential portion 113 in terms of the vertical position of the inner circumferential portion 113, when a ratio of the shrinkage of the insert molding part 120 relative to the thickness thereof in the radial outward direction XO and the radial inward direction XI is assumed to be calculated as 0.3%. The vertical axis (y-axis) represents the vertical positions of the upper region 113U, the middle region 113M, and the lower region 113L of the inner circumferential portion 113 on a unit of mm, and the horizontal axis (x-axis) represents the magnitude of the gap on a unit of mm.

FIG. 11A is a graph showing four kinds of gaps Go, Gu, Gl, and Ga in a collective manner, and FIGS. 11B, 11C, 11D and 11E are graphs showing the four types of gaps Go, Gu, Gl, and Ga, respectively. The gap Go in FIGS. 11A to 11E shows a gap in a ball joint assembly according to a Comparative example in which the upper protruded portion and the lower protruded portion are not be provided. The gap Gu in FIG. 11C represents a position at which the upper protruded portion 113*a* of the ball joint assembly 100 according to the present embodiment is disposed and a gap above the position. The gap Gl in FIG. 11D represents a position at which the lower protruded portion 113*b* of the ball joint assembly 100 according to the present embodiment is disposed and a gap above the position. The gap Ga in FIG. 11E represents an average value of the gap Gu in FIG. 11C and the gap Gl in FIG. 11D.

Referring to FIGS. 11A to 11E, it was found that the gaps Gu and Gl in a portion where the upper protruded portion 113*a* or the lower protruded portion 113*b* is formed is decreased by about 50% to 60% compared to the gap in the corresponding portion in the Comparative example. In addition, it was found that the average gap Ga is decreased by about 25% to 30% compared to the gap Go in the Comparative Example. As described above, according to the ball joint assembly 100 of the present disclosure, the gap between the insert molding part 120 and the inner circumferential portion 113 can be remarkably reduced, which makes it possible to facilitate the mechanical operation using the ball joint assembly 100 in a more smooth manner, and significantly improve the durability of the insert molding part 120.

Next, an experiment example of the ball joint assembly 100 according to an embodiment of the present disclosure will be described with reference to Table 1 below.

TABLE

|  |  | Torque [Nm] | Axial gap [mm] | Radial gap [mm] | Pull-out [kN] | Push-out [kN] |
| --- | --- | --- | --- | --- | --- | --- |
| Comparative example | #1 | 0.24 | 0.057 | 0.135 | — | — |
|  | #2 | 0.24 | 0.040 | 0.149 | 5.82 | — |
|  | #3 | 0.31 | 0.039 | 0.138 | — | 8.49 |
| One embodiment | #1 | 0.47 | 0.025 | 0.104 | — | — |
|  | #2 | 0.4 | 0.030 | 0.111 | 5.96 | — |
|  | #3 | 0.53 | 0.030 | 0.106 | — | 9.79 |
| Another embodiment | #1 | 0.5 | 0.028 | 0.110 | — | — |
|  | #2 | 0.59 | 0.024 | 0.105 | 6.60 | — |
|  | #3 | 0.55 | 0.030 | 0.113 | — | 11.05 |

In Table 1 above, there are shown experiment results obtained for three samples #1, #2 and #3 of the ball joint assembly in the Comparative example in which the upper protruded portion and the lower protruded portion are not provided, three samples #1, #2, and #3 of the ball joint assembly 100 including the mounting part 110 according to the above embodiment described with reference to FIG. 6, and three samples #1, #2, and #3 of the ball joint assembly 100 including the mounting part 110' according to the above another embodiment described with reference to FIG. 7. In Table 1 above, the axial gap refers to the amount of clearance that is generated when the load is applied to the mounting part 110 in the vertical direction with the mounting part 110 fixed. In addition, the radial gap refers to the amount of clearance that is generated when the load is applied to the ball stud 140 in the radial outward direction XO and the radial inward direction XI with the mounting part 110 fixed.

In Table 1 above, the "torque" refers to the magnitude of torque at a time point at which the coupling structure of the insert molding part 120 and the inner circumferential portion 113 is broken, when the torque is applied to the insert molding part 120 in the circumferential direction. In addition, the "Pull-out" refers to the magnitude of force at a time point at which the coupling structure of the insert molding part 120 and the inner circumferential portion 113 is broken, when force is applied to the insert molding part 120 in the upward direction. In addition, the "Push-out" refers to the magnitude of force at a time point at which the coupling structure of the insert molding part 120 and the inner circumferential portion 113 is broken, when force is applied to the insert molding part 120 in the downward direction.

According to the above experiment results, it was confirmed that, the radial gap and the axial gap in the above embodiment and the another embodiment are significantly smaller than those in the Comparative example. In addition, according to the above experimental results, it was confirmed that the magnitudes of the torque, the Pull-out, and the Push-out are increased compared to those in the Comparative example.

Although the technical spirit of the present disclosure has been described using some embodiments and examples shown in the accompanying drawings, it should be noted that various substitutions, modification, and variations can be devised by those skilled in the art to which the present disclosure pertains without departing from the technical spirit and scope of the present disclosure. Further, it should be construed that these substitutions, modifications, and variations are included within the scope of the appended claims.

What is claimed is:

1. A ball joint assembly for vehicle, comprising:
a mounting part having an inner circumferential portion in which a hole is formed in an up-down direction;
a ball stud including a ball and a stud extending from the ball;
a bearing coupled to surround the ball and disposed in the hole; and
an insert molding part configured to fill a space formed between the inner circumferential portion and an outer surface of the bearing in the hole and configured to close one end of the hole,
wherein the inner circumferential portion includes at least one upper protruded portion which protrudes in a direction toward a central axis of the hole in an upper region, and at least one lower protruded portion which protrudes in the direction toward the central axis in a lower region,
wherein the at least one upper protruded portion and the at least one lower protruded portion, which are adjacent to each other in a circumferential direction, are arranged to border on each other in the circumferential direction or arranged to be spaced apart from each other in the circumferential direction when viewed from the top,
wherein the at least one upper protruded portion and the at least one lower protruded portion are arranged so as not to overlap each other when viewed from the top, and
wherein the insert molding part includes an upper engagement portion that fills a gap between a protruded end of the at least one upper protruded portion and the outer surface of the bearing, a lower engagement portion that fills a gap between a protruded end of the at least one lower protruded portion and the outer surface of the bearing, a middle engagement portion that fills a space extending in an axial direction between the upper protruded portion and the lower protruded portion, an upper cover portion that covers an upper surface of the upper protruded portion, and a lower cover portion that covers a lower surface of the lower protruded portion.

2. The ball joint assembly for vehicle of claim 1, wherein the at least one upper protruded portion and the at least one lower protruded portion are alternately arranged in a circumferential direction.

3. The ball joint assembly for vehicle of claim 1, wherein the at least one upper protruded portion includes a plurality of upper protruded portions, and the at least one lower protruded portion includes a plurality of lower protruded portions, and
wherein the plurality of upper protruded portions are arranged to be spaced apart from each other along a circumferential direction, and the plurality of lower protruded portions are arranged to be spaced apart from each other along the circumferential direction.

4. The ball joint assembly for vehicle of claim 1, wherein the insert molding part is formed by injection,
a center of the ball is positioned inside the hole,
the at least one upper protruded portion is disposed above the center of the ball, and
the at least one lower protruded portion is disposed below the center of the ball.

5. The ball joint assembly for vehicle of claim 1, wherein the insert molding part is formed by injection,
a center of the ball is positioned inside the hole, and
on a cross-section taken along the center of the ball in the up-down direction, the outer surface of the bearing is formed to outermost protrude in a radial outward direction at a position lower than the at least one upper protruded portion and above the at least one lower protruded portion.

6. The ball joint assembly for vehicle of claim 1, wherein the at least one upper protruded portion extends in a circumferential direction at an angle of 180 degrees or less, and the at least one lower protruded portion extends in the circumferential direction at the angle of 180 degrees or less.

7. The ball joint assembly for vehicle of claim 1, wherein the at least one upper protruded portion and the at least one lower protruded portion includes a plurality of upper protruded portions and a plurality of lower protruded portions, respectively, a sum of angles at which each of the plurality of upper protruded portions extends in a circumferential direction is in a range of 180 degrees or less, and
a sum of angles at which each of the plurality of lower protruded portions extends in the circumferential direction is in the range of 180 degrees or less.

8. The ball joint assembly for vehicle of claim 1, wherein the at least one upper protruded portion extends in a circumferential direction at an angle of 10 to 90 degrees, and the at least one lower protruded portion extends in a circumferential direction at the angle of 10 to 90 degrees.

9. A stabilizer link, comprising:
a first mounting part having a first inner circumferential portion in which a first hole is formed in a first up-down direction along a first central axis;
a first ball stud including a first ball and a first stud extending from the first ball;
a first bearing coupled to surround the first ball and disposed in the first hole;
a first insert molding part configured to fill a space formed between the first inner circumferential portion and an outer surface of the first bearing in the first hole and configured to close one end of the hole; and
a rod having one end to which the first mounting part is fixed,
wherein the first inner circumferential portion includes at least one first upper protruded portion which protrudes in a direction toward the first central axis in a first upper region, and at least one first lower protruded portion which protrudes in the direction toward the first central axis in a first lower region,
wherein the at least one upper protruded portion and the at least one lower protruded portion, which are adjacent to each other in a circumferential direction, are arranged to border on each other in the circumferential direction or arranged to be spaced apart from each other in the circumferential direction when viewed from the top,
wherein the at least one upper protruded portion and the at least one lower protruded portion are arranged so as not to overlap each other when viewed from the top, and
wherein the insert molding part includes an upper engagement portion that fills a gap between a protruded end of the at least one upper protruded portion and the outer surface of the bearing, a lower engagement portion that fills a gap between a protruded end of the at least one lower protruded portion and the outer surface of the bearing, a middle engagement portion that fills a space extending in an axial direction between the upper protruded portion and the lower protruded portion, an upper cover portion that covers an upper surface of the upper protruded portion, and a lower cover portion that covers a lower surface of the lower protruded portion.

10. The stabilizer link of claim 9, comprising:
a second mounting part having a second inner circumferential portion in which a second hole is formed in a second up-down direction along a second central axis, and provided to be fixed to the other end of the rod;
a second ball stud including a second ball and a second stud extending from the second ball;
a second bearing coupled to surround the second ball and disposed in the second hole; and
a second insert molding part configured to fill a space formed between the second inner circumferential portion and an outer surface of the second bearing in the second hole,
wherein the second inner circumferential portion includes at least one second upper protruded portion which protrudes in a direction toward the second central axis in a second upper region, and at least one second lower protruded portion which protrudes in the direction toward the second central axis in a second lower region.

11. The stabilizer link of claim 10, wherein the at least one first upper protruded portion and the at least one first lower protruded portion are alternately arranged in a circumferential direction, and the at least one second upper protruded portion and the at least one second lower protruded portion are alternately arranged in the circumferential direction.

12. The stabilizer link of claim 10, wherein the first central axis and the second central axis are in a parallel relationship.

13. A method of manufacturing a ball joint assembly for vehicle, the method comprising:
a die-casting step of manufacturing a mounting part by die-casting, wherein the mounting part includes a hole formed in an up-down direction, at least one upper protruded portion which protrudes toward a central axis of the hole in an upper region of the hole, and at least one lower protruded portion which protrudes toward the central axis of the hole in a lower region of the hole;
a positioning step of positioning a bearing to which a ball stud is coupled in the hole, and disposing an injection mold at the mounting part; and
an injection step of forming an insert molding part configured to support the bearing by applying an insert injection into the injection mold so as to fill a space formed between the mounting part and an outer surface of the bearing in the hole and to close one end of the hole,
wherein the at least one upper protruded portion and the at least one lower protruded portion, which are adjacent to each other in a circumferential direction, are arranged to border on each other in the circumferential direction or arranged to be spaced apart from each other in the circumferential direction when viewed from the top,
wherein the at least one upper protruded portion and the at least one lower protruded portion are arranged so as not to overlap each other when viewed from the top, and
wherein the insert molding part includes an upper engagement portion that fills a gap between a protruded end of the at least one upper protruded portion and the outer surface of the bearing, a lower engagement portion that fills a gap between a protruded end of the at least one lower protruded portion and the outer surface of the bearing, a middle engagement portion that fills a space extending in an axial direction between the upper protruded portion and the lower protruded portion, an upper cover portion that covers an upper surface of the upper protruded portion, and a lower cover portion that covers a lower surface of the lower protruded portion.

14. The method of claim 13, wherein in the die-casting step, the mounting part is manufactured by injecting a molten metal into a space formed by an upper die-casting mold and a lower die-casting mold, in a state in which the upper die-casting mold that defines an upper surface of the at least one upper protruded portion and an upper surface of the at least one lower protruded portion and the lower die-casting mold that defines a lower surface of the at least one upper protruded portion and a lower surface of the at least one lower protruded portion are engaged with each other.

15. The method of claim 14, wherein the die-casting step includes separating the upper die-casting mold and the lower die-casting mold from each other in upward and downward directions, respectively, after the injected molten metal is solidified.

16. The method of claim 13, wherein the at least one upper protruded portion and the at least one lower protruded portion are alternately formed in a circumferential direction.

* * * * *